United States Patent
Maxey et al.

(10) Patent No.: US 9,916,256 B1
(45) Date of Patent: Mar. 13, 2018

(54) DDR STORAGE ADAPTER

(71) Applicant: Toshiba Memory Corporation, Minato-ku, Tokyo (JP)

(72) Inventors: David Stanley Maxey, San Jose, CA (US); Nidish Ramachandra Kamath, San Jose, CA (US); Vikas Kumar Agrawal, San Jose, CA (US)

(73) Assignee: Toshiba Memory Corporation, Tokyo (JP)

( * ) Notice: Subject to any disclaimer, the term of this patent is extended or adjusted under 35 U.S.C. 154(b) by 0 days.

(21) Appl. No.: 15/262,434

(22) Filed: Sep. 12, 2016

(51) Int. Cl.
| | |
|---|---|
| G06F 12/10 | (2016.01) |
| G06F 12/1009 | (2016.01) |
| G06F 12/1045 | (2016.01) |
| G06F 12/122 | (2016.01) |
| G06F 12/128 | (2016.01) |

(52) U.S. Cl.
CPC ...... G06F 12/1009 (2013.01); G06F 12/1045 (2013.01); G06F 12/122 (2013.01); G06F 12/128 (2013.01); G06F 2212/65 (2013.01); G06F 2212/69 (2013.01)

(58) Field of Classification Search
CPC .............. G06F 12/1009; G06F 12/1045; G06F 12/122; G06F 12/128
USPC ....... 711/136, 133, 154, 156, 203, 206, 208, 711/221
See application file for complete search history.

(56) References Cited

U.S. PATENT DOCUMENTS

| | | | | |
|---|---|---|---|---|
| 4,520,441 | A * | 5/1985 | Bandoh | G06F 12/0866 711/203 |
| 6,112,285 | A * | 8/2000 | Ganapathy | G06F 12/1027 711/203 |
| 7,475,183 | B2 * | 1/2009 | Traut | G06F 9/45504 711/206 |
| 7,716,411 | B2 | 5/2010 | Panabaker et al. | |
| 8,261,265 | B2 * | 9/2012 | Chen | G06F 9/4426 718/1 |
| 8,555,081 | B2 * | 10/2013 | Chen | G06F 9/4426 713/189 |

(Continued)

OTHER PUBLICATIONS

Anirudh Badam et al., "SSDAlloc: Hybrid SSD/RAM Memory Management Made Easy," USENIX Association Berkeley, CA, Mar. 30-Apr. 1, 2011, pp. 1-14.

(Continued)

*Primary Examiner* — Stephen Elmore
(74) *Attorney, Agent, or Firm* — White & Case LLP (57) ABSTRACT

A method of accessing a persistent memory over a memory interface is disclosed. In one embodiment, the method includes allocating a virtual address range comprising virtual memory pages to be associated with physical pages of a memory buffer and marking each page table entry associated with the virtual address range as not having a corresponding one of the physical pages of the memory buffer. The method further includes generating a page fault when one or more of the virtual memory pages within the virtual address range is accessed and mapping page table entries of the virtual memory pages to the physical pages of the memory buffer. The method further includes transferring data between a physical page of the persistent memory and one of the physical pages of the memory buffer mapped to a corresponding one of the virtual memory pages.

20 Claims, 5 Drawing Sheets

(56) References Cited

U.S. PATENT DOCUMENTS

| | | | | |
|---|---|---|---|---|
| 8,607,013 B2* | 12/2013 | Chen | ................. | G06F 9/4426 |
| | | | | 711/163 |
| 8,719,543 B2* | 5/2014 | Kaminski | ............ | G06F 9/5016 |
| | | | | 711/206 |
| 8,819,676 B2* | 8/2014 | Ports | ................. | G06F 9/4426 |
| | | | | 718/1 |
| 8,943,296 B2* | 1/2015 | Serebrin | ............ | G06F 11/1451 |
| | | | | 711/206 |
| 9,063,877 B2* | 6/2015 | Nakase | ............ | G06F 12/1054 |
| 9,336,033 B2* | 5/2016 | Chen | ................. | G06F 9/4426 |
| 9,658,878 B2* | 5/2017 | Ports | ................ | G06F 9/461 |
| 9,740,637 B2* | 8/2017 | Chen | ............... | G06F 12/1408 |
| 2009/0113110 A1* | 4/2009 | Chen | ................. | G06F 9/4426 |
| | | | | 711/6 |
| 2009/0113111 A1* | 4/2009 | Chen | ................. | G06F 9/4426 |
| | | | | 711/6 |
| 2009/0113216 A1* | 4/2009 | Chen | ................. | G06F 9/4426 |
| | | | | 713/189 |
| 2011/0161620 A1* | 6/2011 | Kaminski | .......... | G06F 12/1009 |
| | | | | 711/207 |

OTHER PUBLICATIONS

Anirudh Badam et al., "Better Flash Access via Shape-shifting Virtual Memory Pages," TRIOS'13 Proceedings of the First ACM SIGOPS Conference on Timely Results in Operating Systems, Article No. 3, ACM New York, NY, Nov. 3-Nov. 6, 2013, pp. 1-14.

* cited by examiner

DDR STORAGE ADAPTER

FIELD OF THE INVENTION

The present invention generally relates to adapting storage technologies to the Double Data Rate (DDR) memory interface that are not intrinsically compatible.

BACKGROUND OF THE INVENTION

Today, operating systems (OSs) provide software mechanisms to allow virtual memory backed by traditional physical block access storage devices such as hard disk drives (HDDs) and solid state drives (SSDs). These mechanisms allow for expanded application memory availability by making the available physical dynamic random-access memory (DRAM) of a host system act as a cache for a much larger traditional physical block access storage device (i.e. HDDs or SSDs). However, traditional physical block access storage devices such as HDDs and SSDs remain reliant on legacy communications interfaces, such as Serial AT Attachment (SATA) with the overhead of a storage software stack to perform input/output (I/O) operations.

Modern storage technologies can produce storage devices whose access latency is significantly lower than traditional spinning disk storage devices (i.e. HDDs) and even flash-based storage devices. However, these modern storage technologies have not yet achieved a low-enough latency to render them compatible with DDR specifications. The latency overhead of the software stack that current OSs have in place to support block and file system access is disproportionate and acts as a significant performance penalty for these modern low-latency storage devices.

What is needed, therefore, is an improved computing environment having access to new, high-performance persistent memory technologies over the memory interface compatible with existing standards or host system software, and without the overhead of a storage software stack to perform I/O operations.

BRIEF DESCRIPTION OF THE INVENTION

In one embodiment, a method of accessing a persistent memory over a memory interface includes allocating a virtual address range comprising virtual memory pages to be associated with physical pages of a memory buffer and marking each page table entry associated with the virtual address range as not having a corresponding one of the physical pages of the memory buffer. The method further includes generating a page fault when one or more of the virtual memory pages within the virtual address range is accessed, and mapping page table entries of the virtual memory pages to the physical pages of the memory buffer. The method further includes transferring data between a physical page of the persistent memory and one of the physical pages of the memory buffer mapped to a corresponding one of the virtual memory pages.

In one embodiment, the persistent memory has a latency that is higher than a maximum specified latency of the memory interface. In one embodiment, the memory interface is a double data rate (DDR)-compliant interface. In one embodiment, the persistent memory comprises non-volatile flash memory devices. In one embodiment, the persistent memory comprises magnetic recording media. In one embodiment, the persistent memory comprises a dual in-line memory module (DIMM)-attached storage subsystem (DASS). In one embodiment, the DASS comprises an SSD. In another embodiment, the DASS comprises an HDD. In yet a further embodiment, the DASS comprises a solid state hybrid drive (SSHD).

In one embodiment, the memory buffer comprises at least one of a host buffer and a DIMM buffer. In one embodiment, the mapping includes detecting if a physical page of the DIMM buffer is available, and if the physical page of the DIMM buffer is available, updating the page table entry of one of the virtual memory pages with the physical page of the DIMM buffer. In yet a further embodiment, the mapping includes detecting if a physical page of the host buffer is available, and if the physical page of the host buffer is available, updating the page table entry of one of the virtual memory pages with the physical page of the host buffer.

In one embodiment, if the physical page of the host buffer is unavailable, the method further includes evicting a selected one of the physical pages of the DIMM buffer and updating the page table entry of the one of the virtual memory pages with the selected one of the physical pages of the DIMM buffer. In one embodiment, evicting the selected one of the physical pages of the DIMM buffer includes determining whether the selected one of the physical pages of the DIMM buffer corresponds to a dirty page table entry and, if so, transferring data from the selected one of the physical pages of the DIMM buffer to a physical page of the persistent memory.

In one embodiment, the selected one of the physical pages of the DIMM buffer is selected using an eviction algorithm. In one embodiment, the eviction algorithm is one of a Least Recently Used (LRU) algorithm, an Adaptive Replacement Cache (ARC) algorithm, or a Least Frequently Used (LFU) algorithm.

In one embodiment, a computer system includes a memory management unit communicatively coupled to a memory buffer having physical pages, a memory interface controller, and a persistent memory via a memory interface. The memory management unit is configured to generate a page fault in response to a request to access one or more virtual memory pages of a virtual address range not having a corresponding one or more of the physical pages of the memory buffer. The memory interface controller is configured to transfer data between a physical page of the persistent memory and one of the physical pages of the memory buffer corresponding to one of the one or more virtual memory pages.

In one embodiment, the memory buffer comprises at least one of a host buffer and a DIMM buffer. In one embodiment, the persistent memory has a latency that is higher than a maximum specified latency of the memory interface. In one embodiment, the memory interface is a DDR-compliant interface. In one embodiment, the persistent memory comprises non-volatile flash memory devices. In one embodiment, the persistent memory comprises magnetic recording media. In one embodiment, the persistent memory comprises a DASS. In one embodiment, the DASS comprises an SSD. In another embodiment, the DASS comprises an HDD. In yet a further embodiment, the DASS comprises a solid state hybrid drive (SSHD).

DETAILED DESCRIPTION OF THE INVENTION

Figure 1:
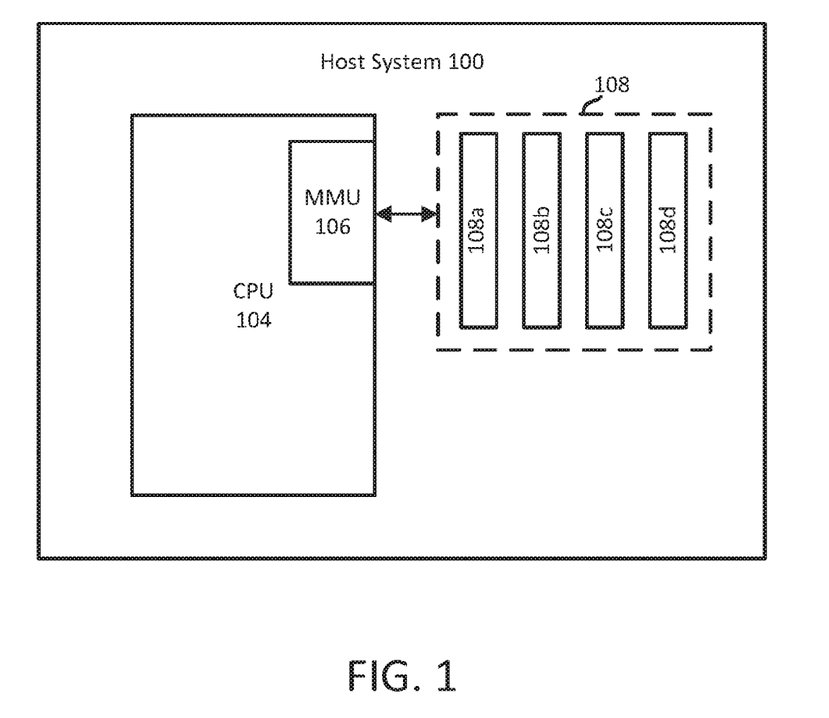
FIG. 1 is a block diagram of a host system, according to one embodiment of the invention.

FIG. 1 is a block diagram of a host system 100, according to one embodiment of the invention. As shown in FIG. 1, host system 100 comprises a Central Processing Unit (CPU) 104 having a Memory Management Unit (MMU) 106. The MMU 106 is communicatively coupled to a plurality of DIMM connectors 108 (108a, 108b, 108c, and 108d) and is responsible for managing access to memory connected to the DIMM connectors 108. In one embodiment, the MMU 106 is communicatively coupled to the plurality of DIMM connectors 108 via a DDR-compliant interface. While only four DIMM connectors 108a, 108b, 108c, and 108d are shown in FIG. 1 for simplicity, in other embodiments, the number of DIMM connectors 108 may be one or more.

In one embodiment, one or more memory modules may be connected to the DIMM connectors 108a, 108b, 108c, or 108d. The memory modules may comprise any suitable memory devices, including DRAM, static random-access memory (SRAM), magnetoresistive random-access memory (MRAM), or the like, and may serve as a host memory buffer for the host system 100. One or more DASSs may also be attached to the DIMM connectors 108a, 108b, 108c, or 108d. The DASSs may serve as a persistent memory for applications running on the host system 100. The DASSs may include one or more DIMM-connected memory buffers. The one or more DIMM buffers may be any suitable memory devices, including DRAM, SRAM, MRAM, etc. In one embodiment, the DASSs comprise non-volatile flash memory. In one embodiment, the DASSs comprise magnetic recording media. In one embodiment, the DASSs comprise an SSD. In another embodiment, the DASSs comprise an HDD. In yet a further embodiment, the DASSs comprises a SSHD.

Figure 2:
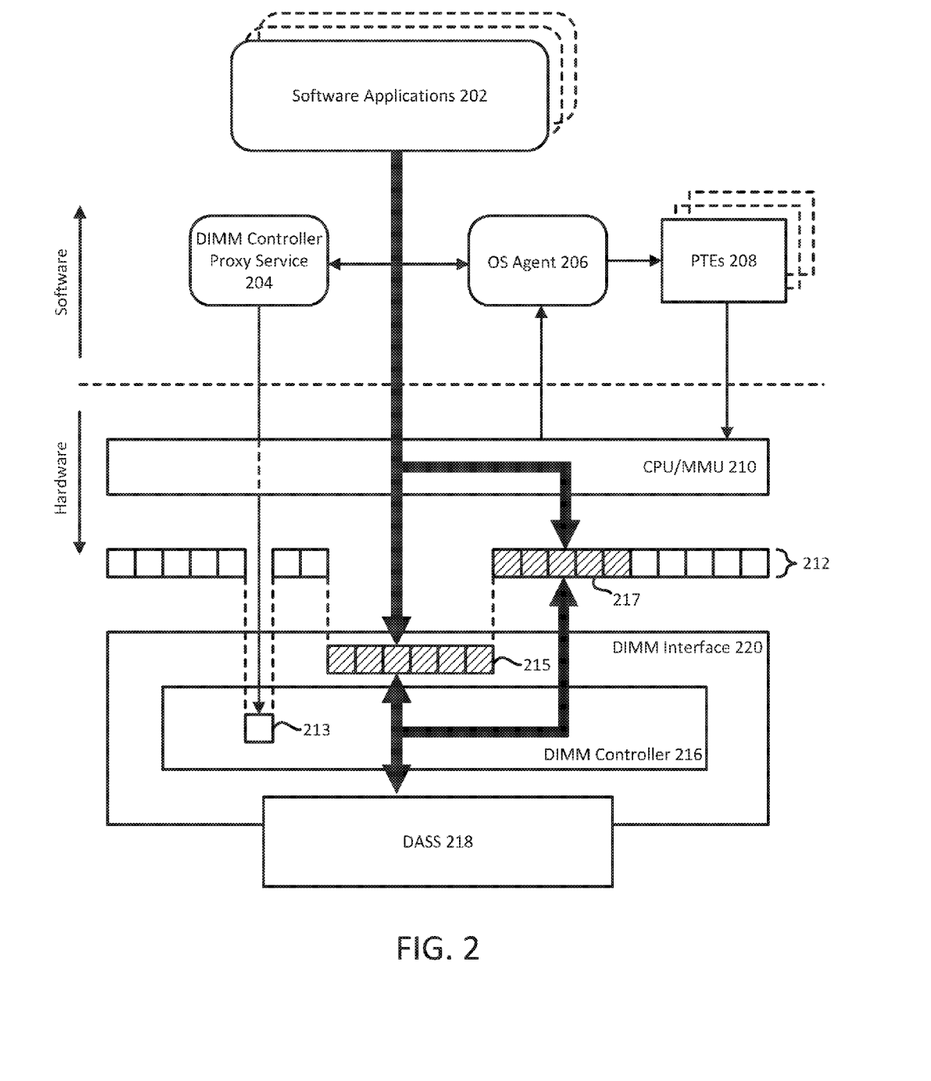
FIG. 2 is a block diagram of hardware and software components enabling access to a DASS, according to one embodiment of the invention.

FIG. 2 is a block diagram of hardware and software components enabling access to a DASS 218, according to one embodiment of the invention. As shown in FIG. 2, the hardware components includes a CPU/MMU 210 communicatively coupled to a pool of I/O memory buffers 212 that includes DIMM buffers 215 associated with the DASS 218 mounted to one or more DIMM connectors (such as the DIMM connectors 108 shown in FIG. 1), host buffers 217 (also mounted to one or more DIMM connectors, such as the DIMM connectors 108 shown in FIG. 1), and a controller command buffer 213 of the DIMM controller 216. The DIMM interface 220 exposes the DIMM controller command buffer 213 used by the software components to communicate with the DIMM controller 216. The DIMM buffers 215, the DIMM controller 216, and a DASS 218 are connected to a DIMM interface 220.

In one embodiment, the DIMM interface 220 operates in accordance with the DDR standards, such as DDR3 or DDR4. In one embodiment, the host buffers 217 may comprise DDR memory modules. In one embodiment, the DIMM buffers 215 comprises DDR memory modules. In other embodiments, the host buffers 217 and the DIMM buffers 215 may comprise any suitable volatile memory modules capable of operating according to the DDR standards. In one embodiment, the DASS 218 comprises non-volatile flash memory. In one embodiment, the DASS 218 comprises magnetic recording media. In one embodiment, the DASS 218 comprises an SSD. In another embodiment, the DASS 218 comprises an HDD. In yet a further embodiment, the DASS 218 comprises a SSHD.

In operation, software applications 202 allocate a virtual address range for use by the software applications 202. The software applications 202 may use Load/Store CPU instructions over the DIMM interface 220. The software applications 202 calls OS Agent 206 to provide memory mapping functions to map some or all of the DASS 218 physical address space to the allocated virtual memory address range. This is because virtual memory is as its name implies: virtual. Virtual memory should be backed by a physical memory. The relationship between the virtual memory address space and the physical memory address space is stored as Page Table Entries (PTEs) 208.

Given the DASS 218 is not inherently compliant with the DIMM interface 220 standards (e.g. the DDR standards), the software applications 202 cannot directly access the physical address spaces of the DASS 218 over the DIMM interface 220. Rather, the OS Agent 206 acts on a page fault that is generated by the CPU/MMU 210 in response to an attempt by the software applications 202 to access a location within the allocated virtual address range which is not yet mapped to a physical address space. CPU/MMU 210 will generate a page fault signal when a Load/Store instruction to read or write a virtual memory address fails because the PTE 208 associated with the address is either indicated as "not valid" or "physical page not present," or the like, and the OS Agent 206 receives the page fault signal and is responsible for resolving the fault.

Following the page fault, the OS Agent 206 allocates one or more pages of the memory buffers 212 to be used for mapping the virtual address range. The OS Agent 206 may allocate pages of the DRAM buffers 212 in a number of different ways. In one embodiment, the OS Agent 206 allocates pages of the memory buffers 212 based on its record of current mappings in effect using the memory buffers 212. In another embodiment, the OS Agent 206 allocates pages of the memory buffers 212 based on a free memory buffer page list.

In yet another embodiment, the OS Agent 206 allocates pages of the memory buffers 212 using an eviction algorithm to evict a previous mapping of the memory buffers 212. The eviction algorithm selects a location in the memory buffers 212 to be re-used for mapping the virtual address range. The eviction algorithm may be any suitable algorithm, such as a LRU algorithm, an ARC algorithm, or a LFU algorithm.

Once the DRAM buffers 212 have been allocated, the OS Agent 206 sends a request to the DIMM controller proxy service 204 to write out dirty (modified but unwritten) page(s) from the allocated memory buffers 212 to the DASS 218 if a previous mapping is being evicted (i.e. the allocated pages of the memory buffers 212 were previously mapped to another virtual address space), and read in the page(s) from the DASS 218 into the allocated memory buffers 212.

The DIMM controller proxy service 204 uses a DIMM controller protocol to communicate with the DIMM controller 216 via the DIMM controller command buffer 213. In one embodiment, if the pages of the memory buffers 212 allocated to the virtual memory address space requested by the software applications 202 belong to the DIMM buffers 215, a DASS interface function copies the page(s) to/from the specified DIMM buffer 215. In one embodiment, if the pages of the memory buffers 212 allocated to the virtual memory address space requested by the software applications 202 belong to the host buffers 217, the DIMM controller 216 copies the page to/from an internal field programmable gate array (FPGA) buffer. In other embodiments, the DIMM controller 216 may comprise an application-specific integrated circuit (ASIC) or a TOSHIBA FIT FAST STRUCTURED ARRAY (FFSA).

Once the page(s) has been copied to/from the DASS 218, the DIMM controller proxy service 204 completes the mapping operation by causing the page to be copied from the FPGA buffer to the host buffer, if the memory buffers 212 allocated to the virtual memory address space are host buffer 217 pages, and sends a response to the OS Agent 206 that the mapping operation has been completed. The OS Agent 204 updates the PTEs 208. In one embodiment, where the memory buffers 212 were allocated using an eviction algorithm, the OS Agent 204 also invalidates any PTEs that referred to memory buffers 212 that were selected for eviction. The OS Agent 204 then updates the PTEs to associate page(s) for the requested virtual address range for the software applications 202 to the allocated memory buffers 212.

Now that there are physical memory buffers 212 allocated to the virtual address range, the page fault condition has been resolved, and the OS Agent 204 can allow the software applications 202 to resume. By generating the page fault, mapping the virtual memory spaces to system memory buffers 212, such as host buffers 217 or DIMM buffers 215, and copying pages to/from the DASS 218 to the mapped memory buffers 212, the software applications 202 may access the DASS 218 over the memory interface without modifying existing standards or the software applications 202. Thus, otherwise incompatible persistent memory storage devices having a latency higher than a maximum latency specified by a host system's memory interface, the persistent memory storage devices can still be accessed via the host system's memory interface without the overhead of a legacy storage software stack to perform I/O operations.

While FIG. 2 shows and describes an embodiment of the present invention in the form of a single software application 202 and a single DASS 218, in other embodiments, a plurality of software applications 202 may access the DASS 218 or a plurality of DASSs 218 in the manner shown and described in connection with FIG. 2.

Figure 3:
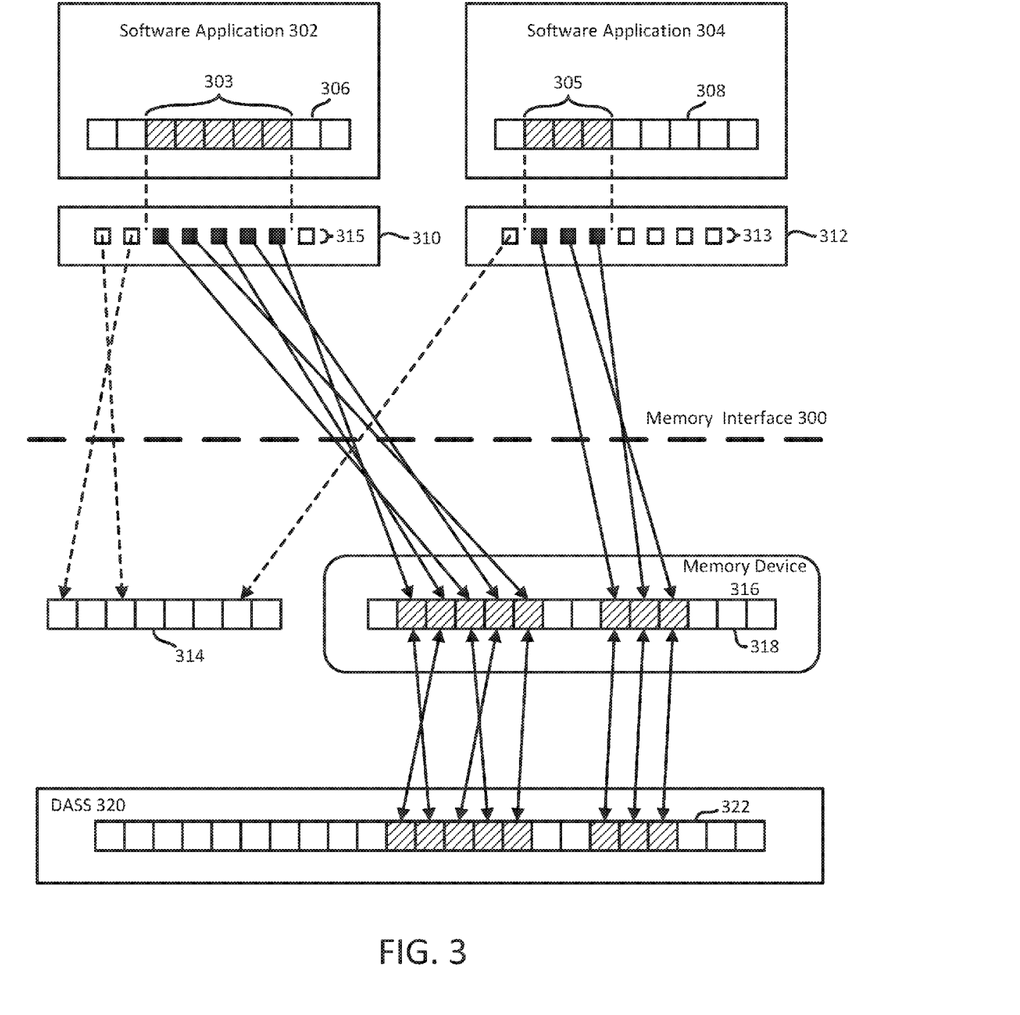
FIG. 3 is a block diagram software applications accessing a DASS over a memory interface, according to one embodiment of the invention.

FIG. 3 is a block diagram of software applications 302 and 304 accessing a DASS 320 over a memory interface 300, according to one embodiment of the invention. As shown in FIG. 3, software applications 302 and 304 each have a virtual address space 306 and 308, respectively. Software application 302 allocates a virtual address range 303 and software application 304 allocates a virtual address range 305. The virtual address ranges 303 and 305 have corresponding PTEs 315 of page table 310 and PTEs 313 of page table 312, respectively. The PTEs 315 and 313 corresponding to the virtual address ranges 303 and 305 are mapped to DIMM buffers 318 of a DIMM-connected volatile memory device 316 associated with the DASS 320.

The mapping of the DIMM buffers 318 to the virtual address ranges 303 and 305 may be accomplished using page faults in the manner as shown and described in FIG. 2. As previously described in connection with FIG. 2, the mapping of the virtual address ranges 303 and 305 to physical memory address of a memory buffer is not limited to the DIMM buffers 318, and can be, for example, host buffers 314. The mapped DRAM buffers 318 can then be copied to/from pages 322 of the DASS 320, in effect, allowing the software applications 302 and 304 to access the DASS 320.

Figure 4:
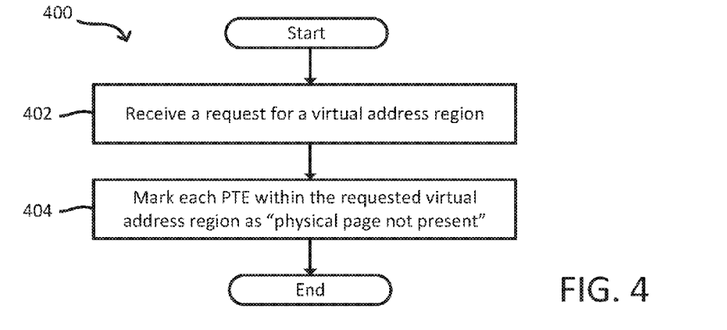
FIG. 4 is a flowchart of method steps to trigger a page fault in order to map a requested virtual address range to access a DASS, according to one embodiment of the invention.

FIG. 4 is a flowchart of method steps 400 to trigger a page fault in order to map a requested virtual address range to access a DASS, according to one embodiment of the invention. At step 402, an OS Agent, for example the OS Agent 206 shown and described in FIG. 2, above, receives a request for a virtual address range from a software application. At step 404, the OS Agent marks each PTE within the requested virtual address region as "physical page not present" or "not valid," or the like. In this manner, a page fault will be triggered when the application attempts to read or write to the virtual address range due to the lack of corresponding physical pages backing the virtual address range, allowing the OS Agent to map the virtual address range to DRAM buffer page(s) as shown and described in FIG. 2.

Figure 5:
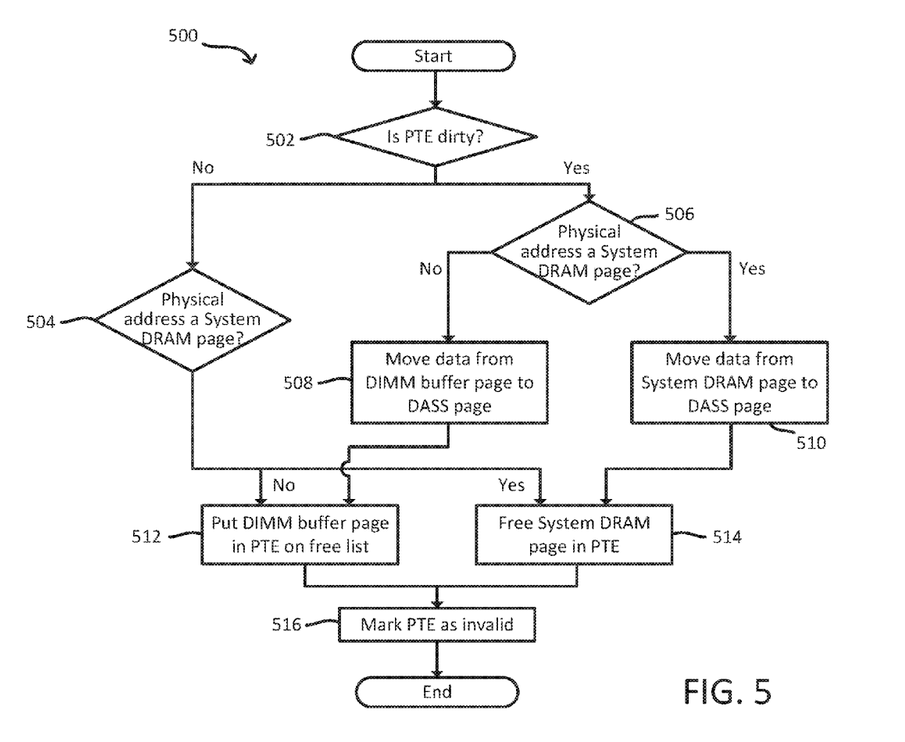
FIG. 5 is a flowchart of method steps for updating PTEs to un-map a virtual address range previously mapped to access a DASS, according to one embodiment of the invention.

FIG. 5 is a flowchart of method steps 500 for updating PTEs to un-map a virtual address range previously mapped to access a DASS, according to one embodiment of the invention. At step 502, a PTE's physical buffer page corresponding to the virtual address range is determined to be dirty or not. As previously discussed, a dirty page refers to a modified page that has not been written to the DASS. If the PTE's physical buffer page is not dirty, then at step 504, whether the PTE's corresponding physical buffer page is a host system DRAM page (i.e. a host buffer) or not is determined. As previously discussed, the host buffer can comprise any suitable memory device, including SRAM and MRAM, and is not limited to DRAM. If not, then the physical buffer page is a DIMM buffer page, and at step 512, the DIMM buffer page corresponding to the PTE is placed back on a free buffer list. If yes, then at step 514, the host system DRAM page is released from the PTE. At step 516, the PTE is then marked "physical page not present" or "not valid," or the like.

Alternatively, if at step 502 the PTE's physical buffer page is dirty, then at step 506, whether the PTE's corresponding physical buffer page is a host system DRAM page or not is determined. If not, then the physical buffer page is a DIMM buffer page, and at step 508, data from the DIMM buffer page is moved to a page of the DASS, and the DIMM buffer page is placed back on the free buffer list at step 512. If yes, then at step 510, data from the host system DRAM page is moved to a page of the DASS, and the host system DRAM page is released from the PTE at step 514. Again, at step 516, the PTE is then marked "physical page not present" or "not valid," or the like.

The method steps 500 are then repeated for every other PTE corresponding to the requested virtual address range.

Figure 6:
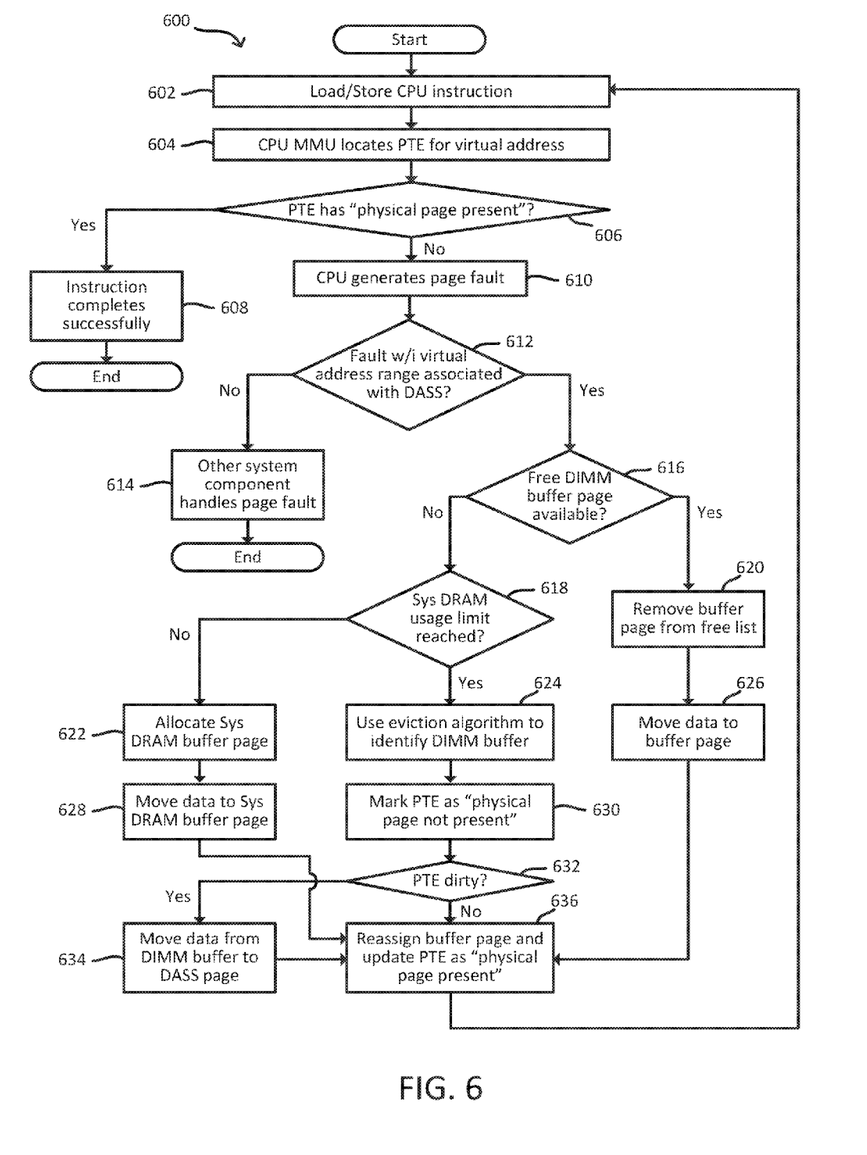
FIG. 6 is a flowchart of method steps for enabling software application access to a DASS, according to one embodiment of the invention.

FIG. 6 is a flowchart of method steps 600 for enabling software application access to a DASS, according to one embodiment of the invention. At step 602, a software application requests access to the DASS using a Load/Store CPU instruction. At step 604, the CPU's MMU locates the PTEs corresponding to the requested virtual address range. At step 606, the MMU determines whether the PTEs corresponding to the requested virtual address range have been marked as "physical page not present," or "not valid," or the like, or whether they have been marked as "physical page present" or "valid," or the like. If the PTEs have been marked as "physical page present" then at step 608, the Load/Store instruction completes successfully and the software application reads or writes data to the physical pages corresponding to the virtual address range.

If the PTEs have been marked as "physical page not present," then as previously described, the MMU generates a page fault signal at step 610. In this case the OS Agent takes over and at step 612, and it is determined whether the page fault resides within the virtual address range to be associated with the DASS. In one embodiment, the OS Agent can be, for example, the OS Agent 204 shown and described in connection with FIG. 2. If the page fault does not reside within the virtual address range to be associated with the DASS, then at step 614, the page fault is passed to another system component to handle as it is unrelated to the request by the software application to access the DASS. If, however, the page fault does in fact correspond to the virtual address range to be associated with the DASS, then at step 616, it is determined whether a free DIMM buffer page is available.

If a free DIMM buffer page is unavailable, then at step 618, it is determined whether the host system DRAM usage limit has been reached (i.e. there are no available host buffer pages to be allocated to the requested virtual address range). If not, and there are free host system DRAM buffer pages, then at step 622, the free host system DRAM buffer pages are allocated to the virtual address range and data (either write or read, depending on the Load/Store CPU instruction) is moved into the allocated host system DRAM buffer pages. At step 636, the PTEs are updated with the allocated host system DRAM buffer pages, and marked as "physical page present" or "valid," or the like. Now that the virtual address range is backed by physical buffer pages, the Load/Store CPU instruction is re-tried at step 602, the MMU locates the PTEs corresponding to the virtual address range that have now been marked as "physical page present" at step 604, which proceeds to step 606 and onto step 608 where the instruction is completed successfully and the instruction is carried out.

Alternatively, if at step 618 it is determined that the host system DRAM usage limit has been reached, then at step 624, an eviction algorithm is used to identify one or more "victim" DIMM page buffers (depending on the virtual address range) to evict. As previously mentioned, the eviction algorithm may be any suitable algorithm, such as a LRU algorithm, an ARC algorithm, or a LFU algorithm. Once the victim DIMM page buffers have been identified, at step 630, the PTEs corresponding to the victim DIMM page buffers are marked as "physical page not present" or "not valid," or the like. At step 632, it is determined whether the victim DIMM page buffers are dirty. If they are, then at step 634, the data from the victim DIMM page buffers are moved to page buffers of the DASS, and at step 636, the PTEs corresponding to the virtual address range are updated with the allocated victim DIMM buffer pages, and marked as "physical page present" or "valid," or the like. If the victim DIMM page buffers are determined to be not dirty at step 632, then there is no need to move the data at step 634, and at step 636, the PTEs corresponding to the virtual address range are updated with the allocated victim DIMM buffer pages, and marked as "physical page present" or "valid," or the like.

Again, now that the virtual address range is backed by physical buffer pages, the Load/Store CPU instruction is re-tried at step 602, the MMU locates the PTEs corresponding to the virtual address range that have now been marked as "physical page present" at step 604, which proceeds to step 606 and onto step 608 where the instruction is completed successfully and the instruction is carried out. Following the method steps 600, data can be written to or read from the allocated memory buffers by the DASS, as shown in FIG. 3, for example, in effect enabling the software application to access the DASS over the memory interface.

Other objects, advantages and embodiments of the various aspects of the present invention will be apparent to those who are skilled in the field of the invention and are within the scope of the description and the accompanying Figures. For example, but without limitation, structural or functional elements might be rearranged, or method steps reordered, consistent with the present invention. Similarly, principles according to the present invention could be applied to other examples, which, even if not specifically described here in detail, would nevertheless be within the scope of the present invention.

What is claimed is:

1. A method of accessing a persistent memory over a memory interface comprising:
    allocating a virtual address range comprising virtual memory pages to be associated with physical pages of a memory buffer;
    marking each page table entry associated with the virtual address range as not having a corresponding one of the physical pages of the memory buffer;
    generating a page fault when one or more of the virtual memory pages within the virtual address range is accessed;
    mapping page table entries of the virtual memory pages to the physical pages of the memory buffer; and
    transferring data between a physical page of the persistent memory and one of the physical pages of the memory buffer mapped to a corresponding one of the virtual memory pages.

2. The method of claim 1, wherein the memory buffer comprises at least one of a host buffer and a DIMM buffer.

3. The method of claim 2, wherein the mapping comprises:
    detecting if a physical page of the DIMM buffer is available; and
    if the physical page of the DIMM buffer is available,
    updating the page table entry of one of the virtual memory pages with the physical page of the DIMM buffer.

4. The method of claim 2, wherein the mapping comprises:
    detecting if a physical page of the host buffer is available; and
    if the physical page of the host buffer is available,
    updating the page table entry of one of the virtual memory pages with the physical page of the host buffer.

5. The method of claim 3, wherein if the physical page of the DIMM buffer is unavailable,
    evicting a selected one of the physical pages of the DIMM buffer; and
    updating the page table entry of one of the virtual memory pages with the selected one of the physical pages of the DIMM buffer.

6. The method of claim 5, wherein evicting the selected one of the physical pages of the DIMM buffer comprises:
    determining whether the selected one of the physical pages of the DIMM buffer corresponds to a dirty page table entry; and if so, transferring data from the selected one of the physical pages of the DIMM buffer to a physical page of the persistent memory.

7. The method of claim 5, wherein the selected one of the physical pages of the DIMM buffer is selected using an eviction algorithm.

8. The method of claim 7, wherein the eviction algorithm is one of a Least Recently Used algorithm, an Adaptive Replacement Cache algorithm, and a Least Frequently Used algorithm.

9. The method of claim 1, wherein the persistent memory has a latency that is higher than a maximum specified latency of the memory interface.

10. The method of claim 1, wherein the memory interface is a DDR-compliant interface.

11. The method of claim 1, wherein the persistent memory comprises at least one of non-volatile flash memory devices and magnetic recording media.

12. The method of claim 1, wherein the persistent memory comprises a DIMM-attached storage subsystem.

13. The method of claim 12, wherein the DIMM-attached storage subsystem is one of an SSD, an HDD, and an SSHD.

14. A computer system comprising:
a memory management unit communicatively coupled to a memory buffer having physical pages, a memory interface controller, and a persistent memory via a memory interface, wherein the memory management unit is configured to generate a page fault in response to a request to access one or more virtual memory pages of a virtual address range not having a corresponding one or more of the physical pages of the memory buffer, and the memory interface controller is configured to transfer data between a physical page of the persistent memory and one of the physical pages of the memory buffer corresponding to one of the one or more virtual memory pages.

15. The computer system of claim 14, where the memory buffer comprises at least one of a host buffer and a DIMM buffer.

16. The computer system of claim 14, wherein the persistent memory has a latency that is higher than a maximum specified latency of the memory interface.

17. The computer system of claim 14, wherein the memory interface is a DDR-compliant interface.

18. The computer system of claim 14, wherein the persistent memory comprises at least one of non-volatile flash memory devices and magnetic recording media.

19. The computer system of claim 14, wherein the persistent memory comprises a DIMM-attached storage subsystem.

20. The computer system of claim 19, wherein the DIMM-attached storage subsystem is one of an SSD, an HDD, and an SSHD.

\* \* \* \* \*